United States Patent
Hirko et al.

(10) Patent No.: US 11,760,557 B2
(45) Date of Patent: Sep. 19, 2023

(54) PRESSURE EQUILIBRATING SQUEEZE DISPENSER

(71) Applicants: Andrew Keith Hirko, Castle Rock, CO (US); Briana Nikole Kovács, Castle Rock, CO (US); Michael Hunter Kovács, Castle Rock, CO (US)

(72) Inventors: Andrew Keith Hirko, Castle Rock, CO (US); Briana Nikole Kovács, Castle Rock, CO (US); Michael Hunter Kovács, Castle Rock, CO (US)

(73) Assignee: PESD, LLC, Castle Rock, CO (US)

( * ) Notice: Subject to any disclaimer, the term of this patent is extended or adjusted under 35 U.S.C. 154(b) by 0 days.

(21) Appl. No.: 17/953,492

(22) Filed: Sep. 27, 2022

(65) Prior Publication Data

US 2023/0119159 A1  Apr. 20, 2023

Related U.S. Application Data

(60) Provisional application No. 63/255,470, filed on Oct. 14, 2021.

(51) Int. Cl.
*B65D 83/00* (2006.01)
*F16K 17/02* (2006.01)

(52) U.S. Cl.
CPC .... *B65D 83/0061* (2013.01); *B65D 2583/005* (2013.01); *F16K 17/02* (2013.01)

(58) Field of Classification Search
CPC .......... B65D 83/0061; B65D 2583/005; B65D 83/0055; B65D 83/14; B65D 83/16; B65D 83/38; B65D 47/2018; F16K 17/02; B67D 7/0244
USPC ............................................. 222/95, 94, 209
See application file for complete search history.

(56) References Cited

U.S. PATENT DOCUMENTS

| | | | | |
|---|---|---|---|---|
| 2,804,995 A | * | 9/1957 | Fee ..................... | B65D 83/0055 222/386.5 |
| 3,592,365 A | * | 7/1971 | Schwartzman .... | B65D 47/2075 222/386.5 |
| 4,098,434 A | * | 7/1978 | Uhlig ................. | B65D 83/0055 222/105 |
| 4,331,264 A | * | 5/1982 | Staar .................. | B65D 75/5822 222/94 |
| 4,469,250 A | * | 9/1984 | Evezich ............. | B65D 83/0055 222/83.5 |
| 4,760,937 A | * | 8/1988 | Evezich ............. | B65D 83/0055 222/209 |
| 5,012,956 A | * | 5/1991 | Stoody ............... | B65D 83/0055 222/206 |
| 5,454,896 A | * | 10/1995 | Harding ............. | B29C 65/3612 53/449 |

(Continued)

*Primary Examiner* — Paul R Durand
*Assistant Examiner* — Michael J. Melaragno
(74) *Attorney, Agent, or Firm* — Limor Gabay

(57) ABSTRACT

A bag-in-bottle type of a squeeze dispenser comprising a housing, a cap, a flexible bag for containing fluid, and means to equilibrate atmospheric air pressure with air pressure inside the housing is disclosed. Said means include a closable air channel. The closable air channel, and the cap, may each be in an open or a closed position. When the cap is in an open position, the closable air channel is in a closed position, thus substantially locking the air inside the housing in place and allowing for fluid to be dispensed from the flexible bag upon application of pressing force on the sidewalls of the housing. When the cap is in a closed position, the closable air channel is in an open position, allowing for a flow of atmospheric air into, and out of, the dispenser housing and thereby equilibrating the air pressure inside the housing with air pressure of the atmospheric air.

15 Claims, 17 Drawing Sheets

(56) References Cited

U.S. PATENT DOCUMENTS

| | | | | |
|---|---|---|---|---|
| 5,497,910 | A * | 3/1996 | Meadows | B65D 83/0055 222/494 |
| 5,497,912 | A * | 3/1996 | Hoback | A61M 5/1486 604/141 |
| 5,823,400 | A * | 10/1998 | Omori | B65D 47/2056 222/321.9 |
| 6,364,163 | B1 * | 4/2002 | Mueller | B65D 83/0072 222/481.5 |
| 8,408,426 | B2 * | 4/2013 | Bakhos | B65D 81/245 222/105 |
| 11,090,669 | B2 * | 8/2021 | Beer | B05B 11/048 |
| 2003/0089735 | A1 * | 5/2003 | Iwatsubo | B65D 47/242 222/105 |
| 2006/0226171 | A1 * | 10/2006 | Sternberg | B65D 83/0055 222/95 |
| 2007/0231622 | A1 * | 10/2007 | Kozu | H01M 8/04208 222/206 |
| 2007/0262092 | A1 * | 11/2007 | Tyski | B65D 83/0055 222/105 |
| 2009/0224002 | A1 * | 9/2009 | Bakhos | B65D 83/0055 222/386.5 |
| 2010/0230438 | A1 * | 9/2010 | Sardo, Jr. | B65D 83/0055 222/105 |
| 2012/0111894 | A1 * | 5/2012 | Bakhos | B65D 47/2018 222/386.5 |
| 2013/0015188 | A1 * | 1/2013 | Cheetham | A61C 5/62 220/351 |
| 2023/0119159 | A1 * | 4/2023 | Hirko | B65D 47/2006 222/1 |

* cited by examiner

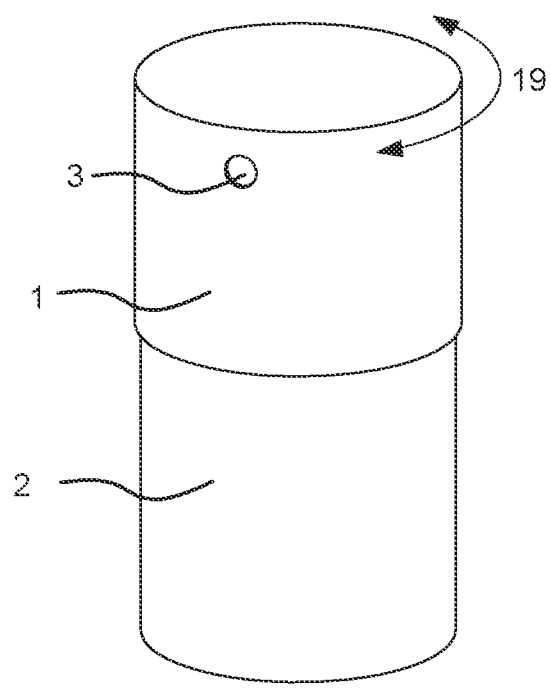
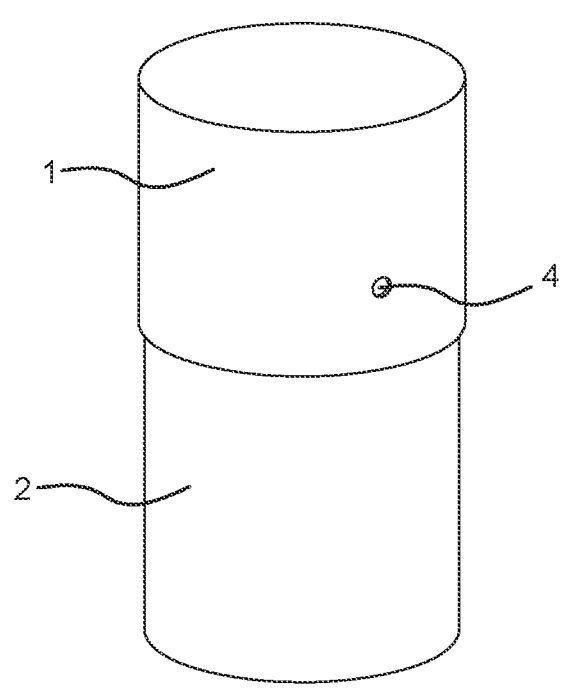
Fig. 6A
Fig. 6B

PRESSURE EQUILIBRATING SQUEEZE DISPENSER

TECHNICAL FIELD

The presently disclosed subject matter relates generally to a squeeze dispenser and more particularly to a bag-in-bottle type of a dispenser, comprising a flexible bag for containing and dispensing of fluid and means to equilibrate atmospheric air pressure with air pressure inside the dispenser.

BACKGROUND

Bag-in-bottle squeeze type bottle dispensers are well known for use in packaging and dispensing various types of fluids, including fluids which are more viscous such as condiments or creams. An advantage of bag-in-bottle dispensers is that the fluid (product) is contained in the bag and ideally prevented from making contact with the atmospheric air, thus the product shelf life is prolonged, the product integrity is improved, and waste reduced. Furthermore, all contents may be expelled, rather than becoming stuck to the walls of the bottle.

However, a general problem with bag-in-bottle type squeeze dispensers of the prior art is that when the dispenser is not in use, for example, when the dispenser is transported from a manufacturing facility to stores or consumers, air pressure variances are created between the atmospheric air and the air inside the dispenser (in-between the bottle and the bag). Such air pressure variances are sometimes created due to changes in the temperature of the atmospheric air or a change in altitude, for example, when the dispenser is transported by air transportation. When such air pressure variances occur and the air pressure inside the dispenser is greater than the pressure of the atmospheric air, it may cause the dispenser's contents to expel involuntarily upon opening the cap for use.

There is a need for an improved bag-in-bottle type squeeze dispenser which eliminates air pressure differences between atmospheric air and the air inside the dispenser, and thus reduces or eliminates, waste and mess from unintended and wasteful expulsion or splattering of the dispenser's contents, which may be upsetting to the user.

SUMMARY

In accordance with the present invention, various embodiments of a squeeze dispenser and methods of use thereof are disclosed. In one embodiment, a squeeze dispenser is provided, the squeeze dispenser comprising: a non-rigid housing and a cap comprising a dispensing valve means, a dispensing pathway, and a dispensing opening, wherein said dispensing valve means and dispensing pathway are in a fluid communication. The presently disclosed squeeze dispenser further comprises a flexible bag for holding a fluid, said flexible bag substantially located within said non-rigid housing and extending downwards from said cap and the bag being in fluid communication with said dispensing valve means. In some other embodiments, the dispensing valve means is positioned within the non-rigid housing. In some embodiments, the presently disclosed squeeze dispenser further comprises a one-way air valve located on the housing.

In some embodiments, an interior side of the non-rigid housing and an exterior side of the flexible bag define therebetween a housing internal space. In some embodiments, the housing internal space is airtight, or substantially airtight, and a pressing force on sidewalls of the non-rigid housing deforms the non-rigid housing side walls inward toward the flexible bag, thereby causing an amount of fluid to be dispensed out of the flexible bag. In some embodiments, the one-way air valve allows ingress of atmospheric air into the housing internal space to compensate for the flexible bag reduced volume after said amount of fluid is dispensed and the pressing force has ceased. In some embodiments, an interior side of the cap and sides of the non-rigid housing proximal to said cap define therebetween a cap internal space.

In some embodiments, the cap may be in an open or a closed position; and wherein when the cap is in the open position the dispensing pathway and dispensing opening align and when the cap is in the closed position the dispensing pathway and dispensing opening do not align.

In some embodiments, the cap is moved from a closed position to an open position, and vice versa, by a manual movement selected from a group comprising press or pull, seesaw rotation, and a spin rotation.

In some embodiments, the squeeze dispenser further comprises a closable air channel; wherein the closable air channel may be in an open or in a closed position; and wherein the closable air channel, when in an open position, allows for atmospheric air flow into, or out of, the housing internal space.

In some embodiments, the squeeze dispenser further comprises an air opening; wherein the air opening is an opening in a wall of the cap or in a wall of the housing.

In some embodiments, the closable air channel is substantially a tunnel-like structure comprising two ends, wherein a first end opens into the housing internal space; and wherein a second end is closable and opens either into the cap internal space, an interior sidewall of the cap or into the air opening.

In some embodiments, the closable air channel is in an open position when the air opening is aligned with the second end of the closable air channel, allowing atmospheric air to flow into, or out of, the housing internal space.

In some embodiments, when the cap is moved to a closed position, or is in a closed position, the air opening aligns with the second end of the closable air channel allowing atmospheric air flow into, or out of, the housing internal space via the closable air channel; and, wherein when the cap is moved to an open position, or is in an open position, the closable air opening does not align with the second end of the closable air channel, thus preventing atmospheric air flow into, or out of, the housing internal space via the air channel.

In some embodiments, a method of using the presently disclosed squeeze dispenser comprises the steps of:
(a) moving the cap to an open position by pulling it away from the non-rigid housing and thereby closing the closable air channel;
(b) applying a pressing force on sidewalls of the non-rigid housing, thereby deforming the non-rigid housing sidewalls inward toward the flexible bag;
(c) collecting the fluid dispensed out of the dispensing opening;
(d) ceasing the pressing force and allowing the non-rigid housing sidewalls to return to their original shape;
(e) repeating steps (b), (c), and (d) as desired to dispense more fluid or otherwise moving the cap to a closed position by pressing it towards the non-rigid housing, thereby opening the closable air channel.

In some other embodiments, a method of using the presently disclosed squeeze dispenser comprises the steps of:

(a) moving the cap to an open position by spin rotating it relative to the non-rigid housing, thereby closing the closable air channel;
(b) applying a pressing force on sidewalls of the non-rigid housing, thereby deforming the non-rigid housing sidewalls inward toward the flexible bag;
(c) collecting the fluid dispensed out of the dispensing opening;
(d) ceasing the pressing force and allowing the non-rigid housing sidewalls to return to their original shape;
(e) repeating steps (b), (c), and (d) as desired to dispense more fluid or otherwise moving the cap to a closed position by spinning it in the opposite direction of the rotation of step (a), thereby opening the closable air channel.

According to yet another embodiment of the presently disclosed squeeze dispenser, the air opening allows for atmospheric air flow into, or out of, the cap internal space and the second end of the closable air channel opens into the cap internal space.

In some embodiments, the cap comprises a Closing mean for closing the second end of the closable air channel. In some embodiments, the closing mean is a protrusion designed to fit into, or around, the second end of the closable air channel. In some embodiments, when the closing mean is fitted into, or around, the second end of the closable air channel, the closure is air-tight.

In some embodiments, when the cap is moved to a Closed position, or is in a Closed position, the second end of the closable air channel is open allowing atmospheric air flow into, or out of the housing internal space via the closable air channel; and wherein when the cap is moved to an open position, or is in an open position, the closing means closes the second end of the closable air channel, thus preventing atmospheric air flow into, or out of, the housing internal space via the closable air channel.

In some embodiments, a method of using the presently disclosed squeeze dispenser comprises the steps of:

(a) moving the cap to an open position using a seesaw rotation, thus closing the closable air channel;
(b) applying a pressing force on sidewalk of the non-rigid housing, thereby deforming the non-rigid housing sidewalls inward toward the flexible bag;
(c) collecting the fluid dispensed out of the dispensing opening;
(d) ceasing the pressing force and allowing the non-rigid housing sidewalk to return to their original shape;
(e) repeating steps (b), (c), and (d) as desired to dispense more fluid or otherwise moving the cap to a closed position using a seesaw rotation in the opposite direction of the rotation of step (a), thereby opening the closable air channel.

BRIEF DESCRIPTION OF THE DRAWINGS

Figure 1A:
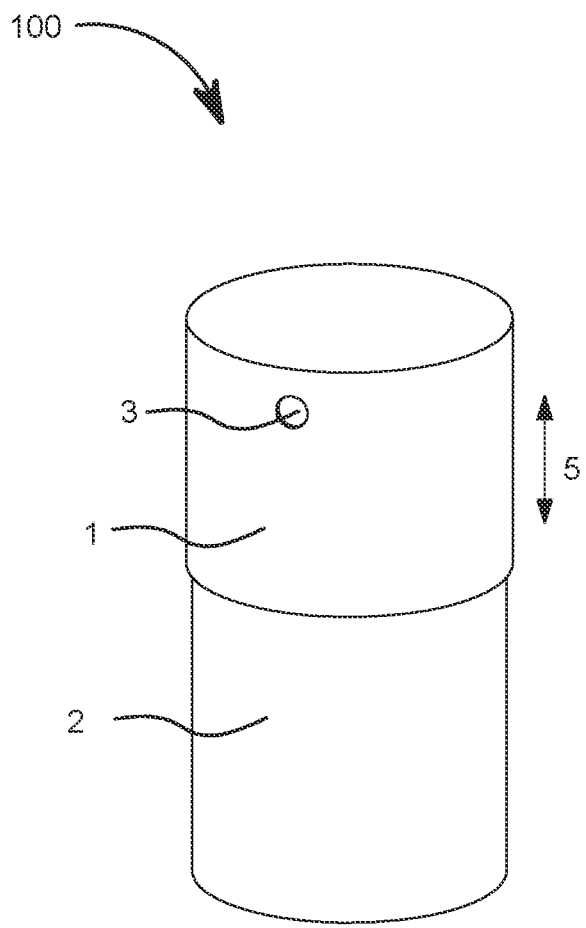
Figure 1B:
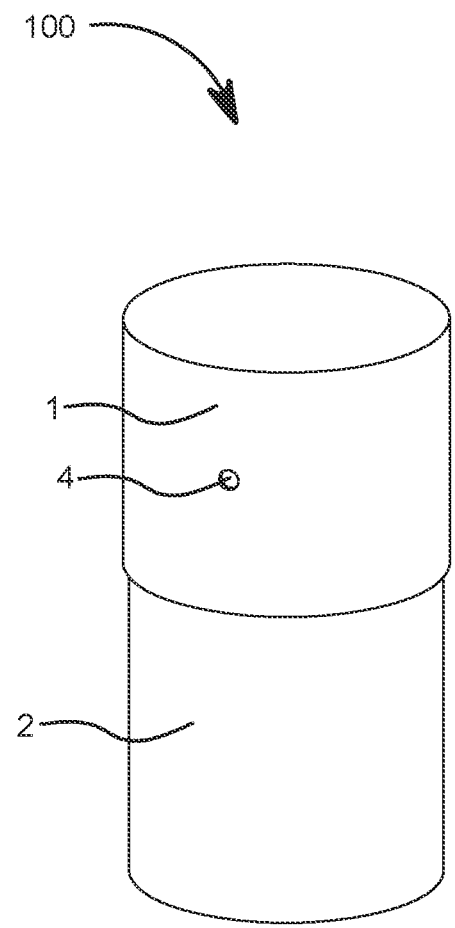
Figure 2:
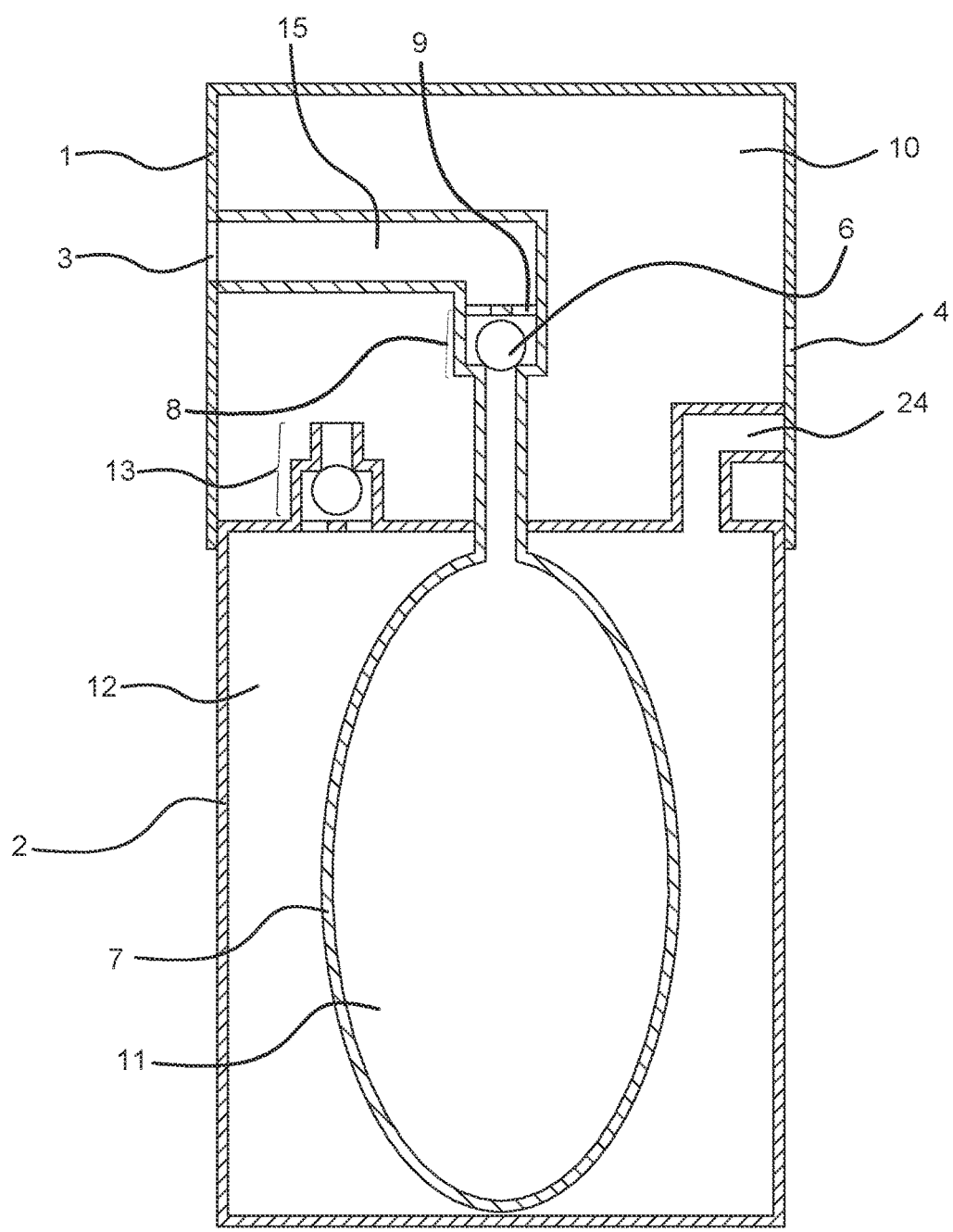
Figure 3:
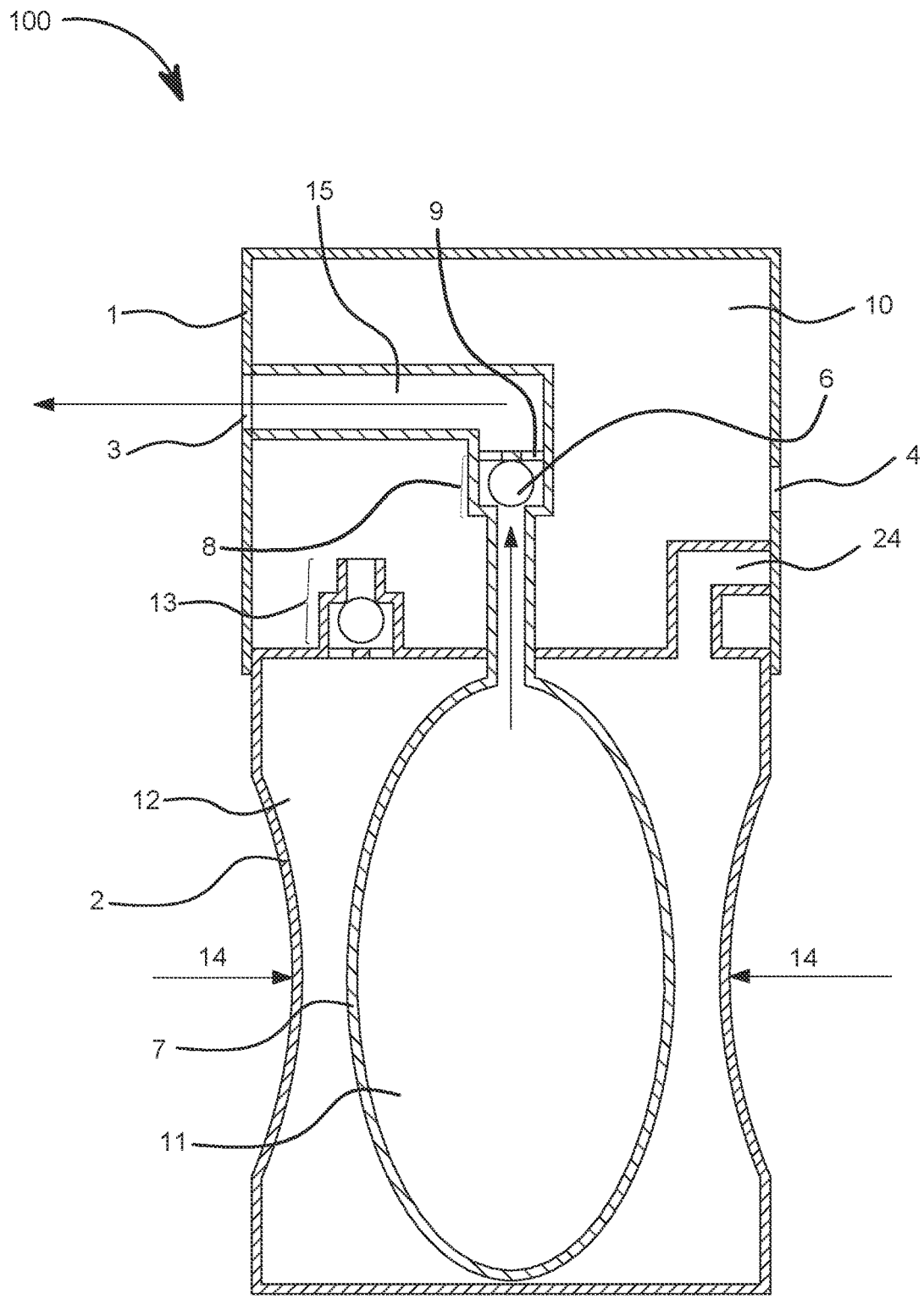
Figure 4:
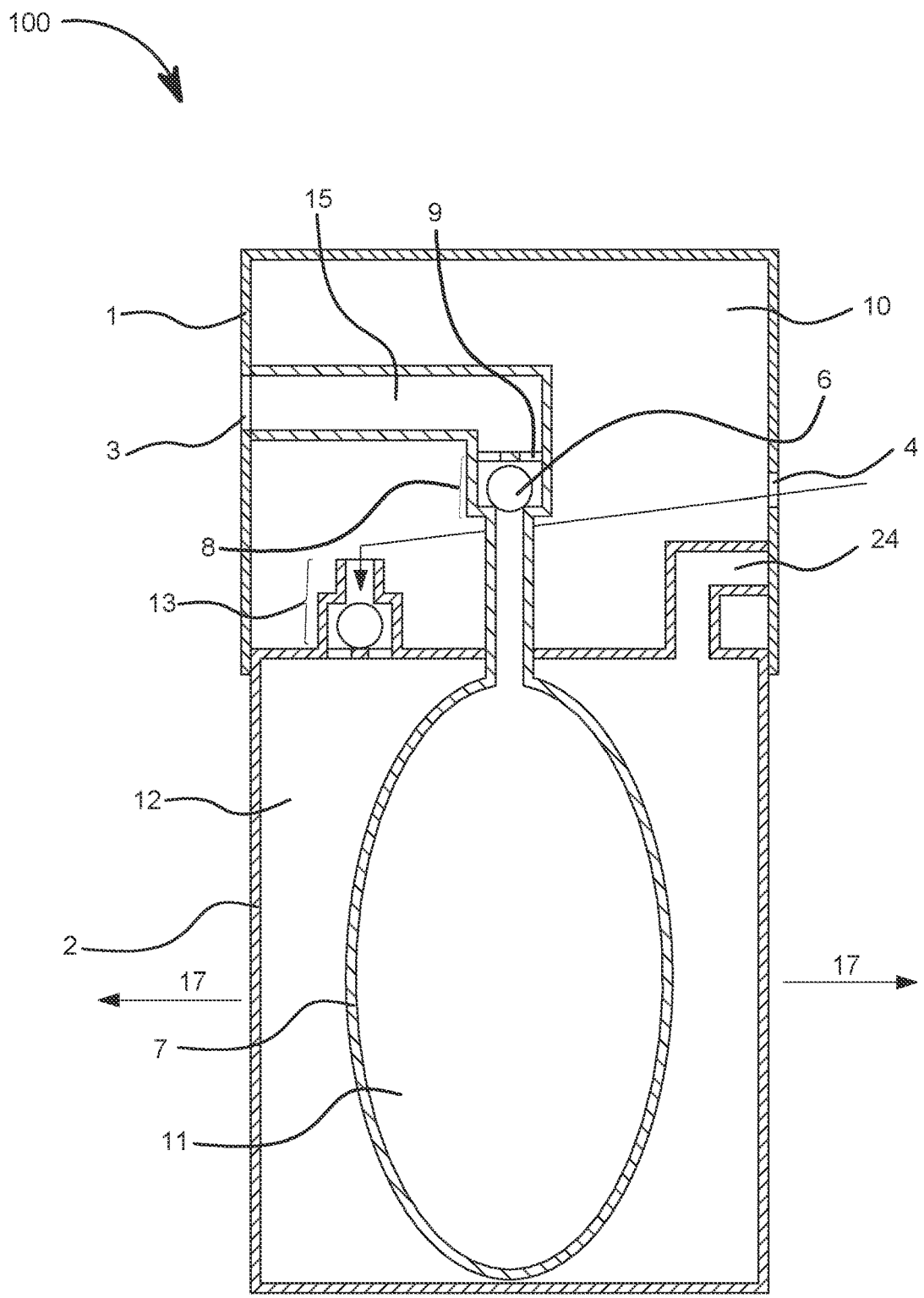
Figure 5:
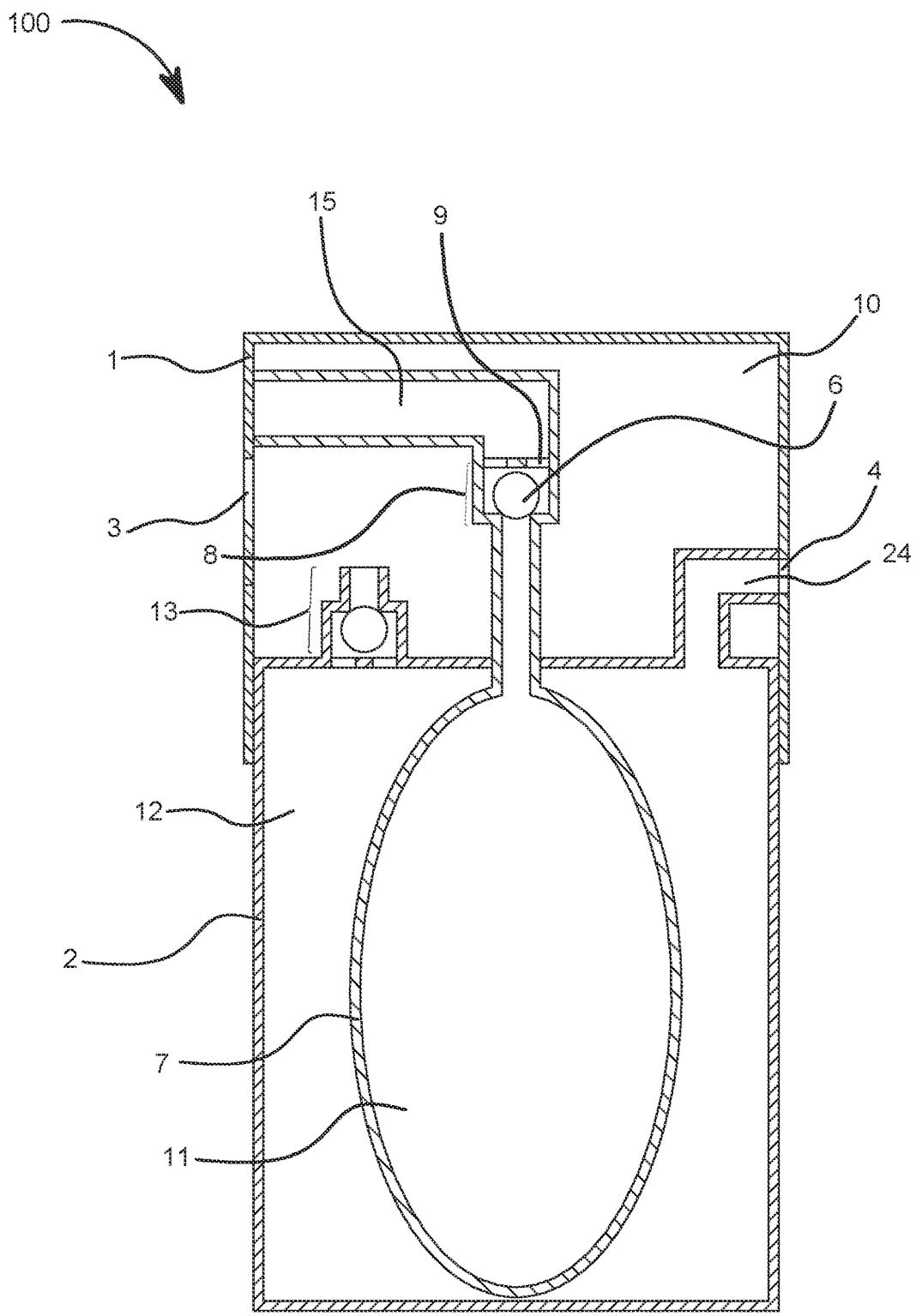
Figure 7:
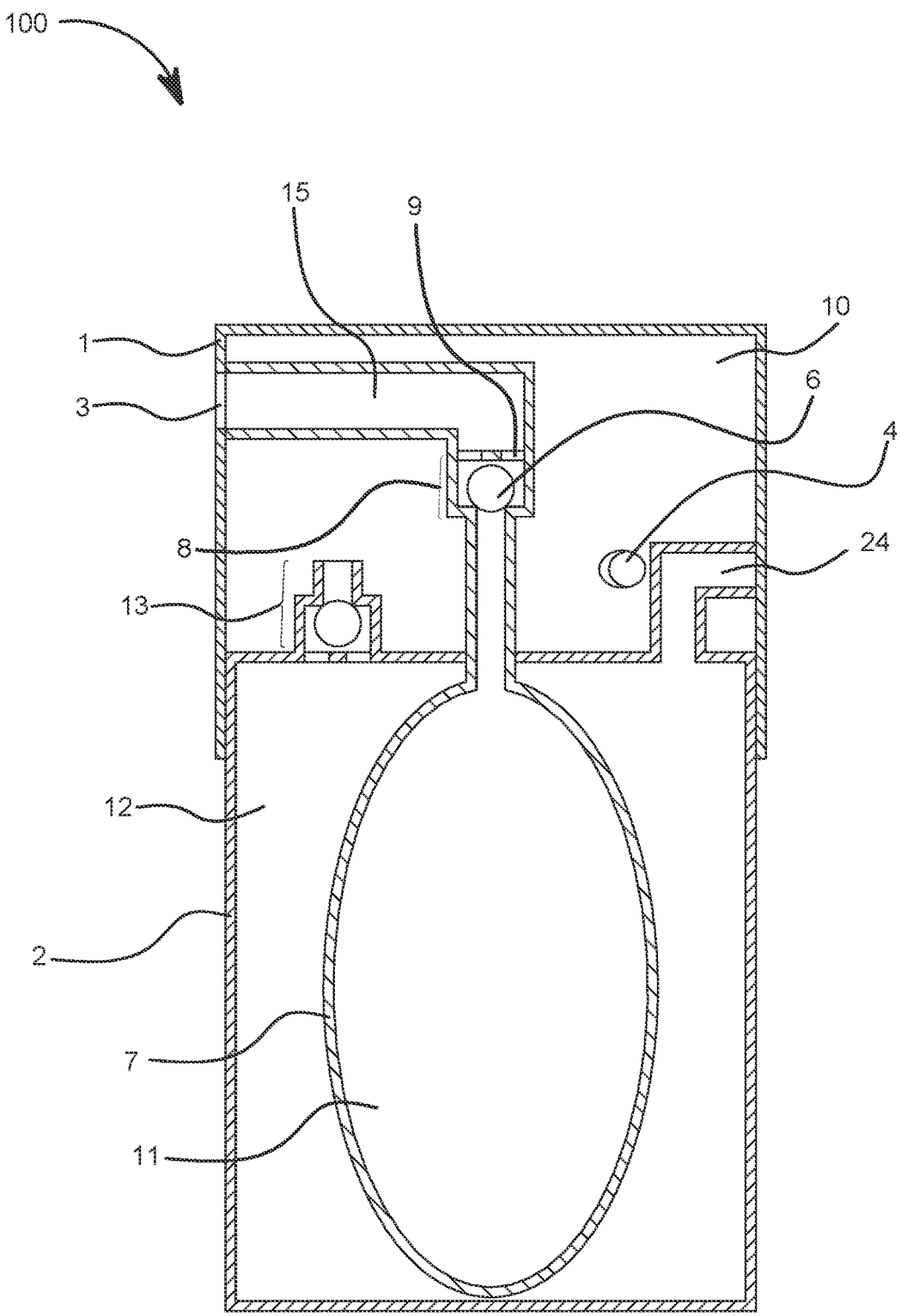
Figure 8:
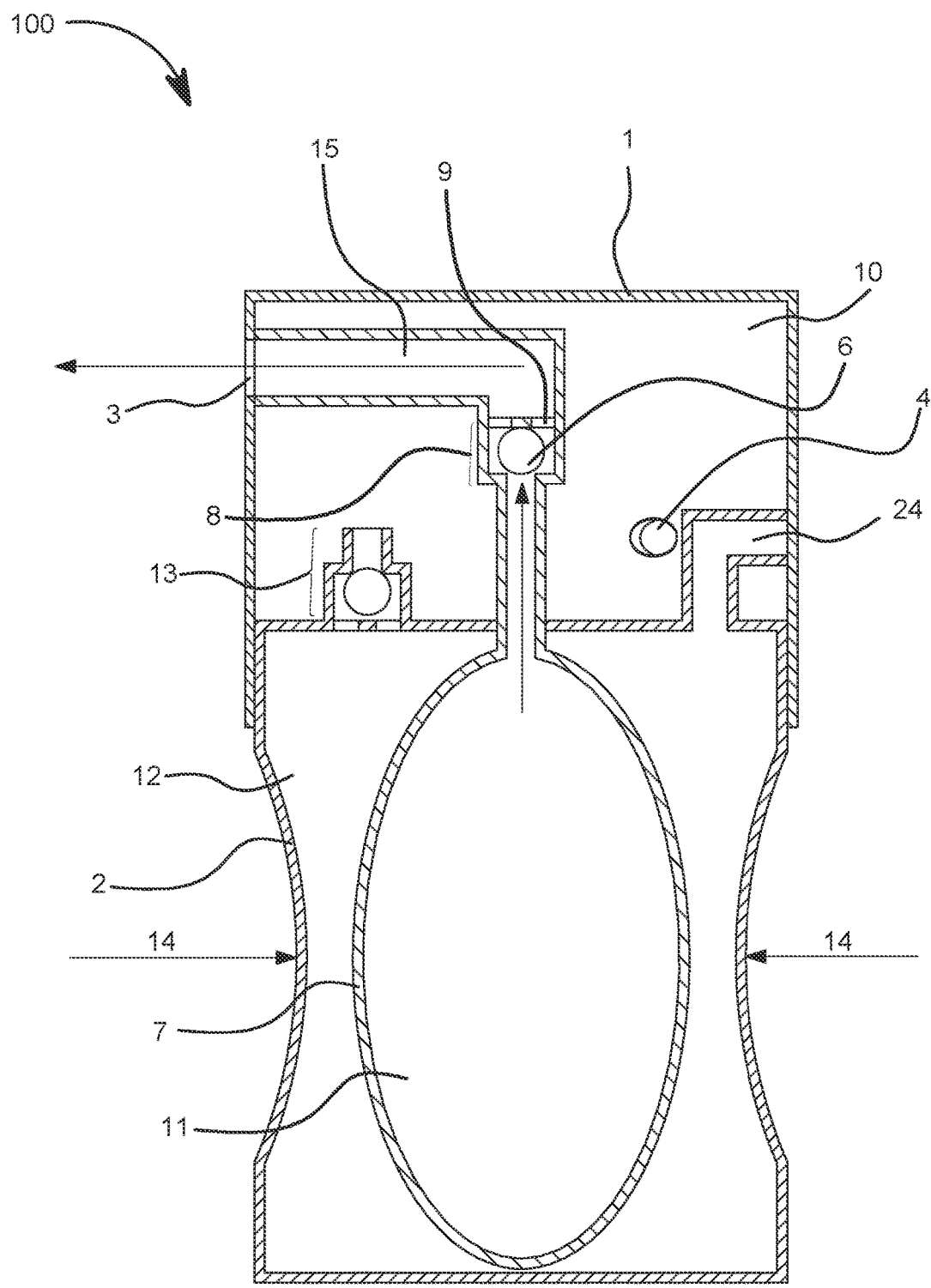
Figure 9:
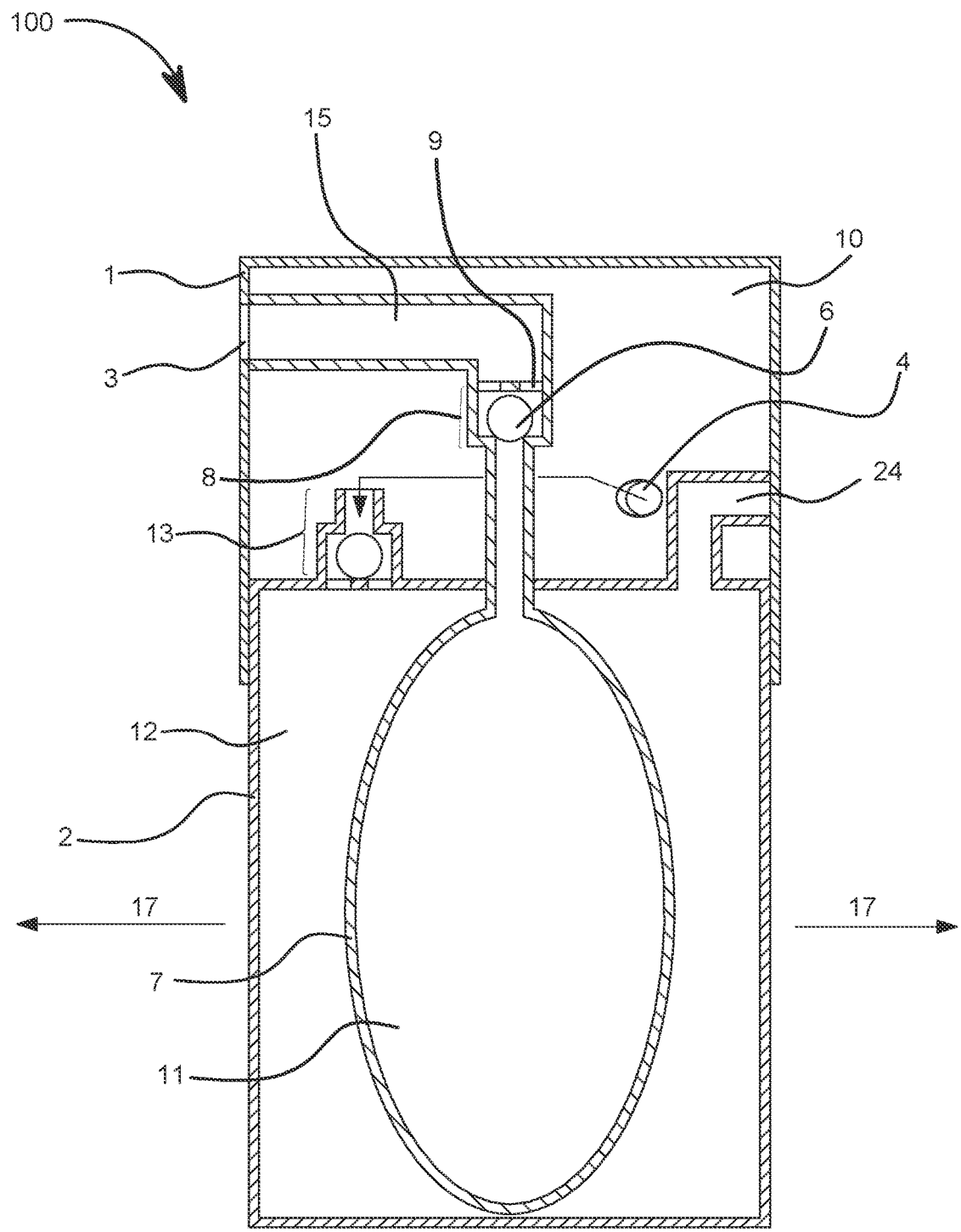
Figure 10:
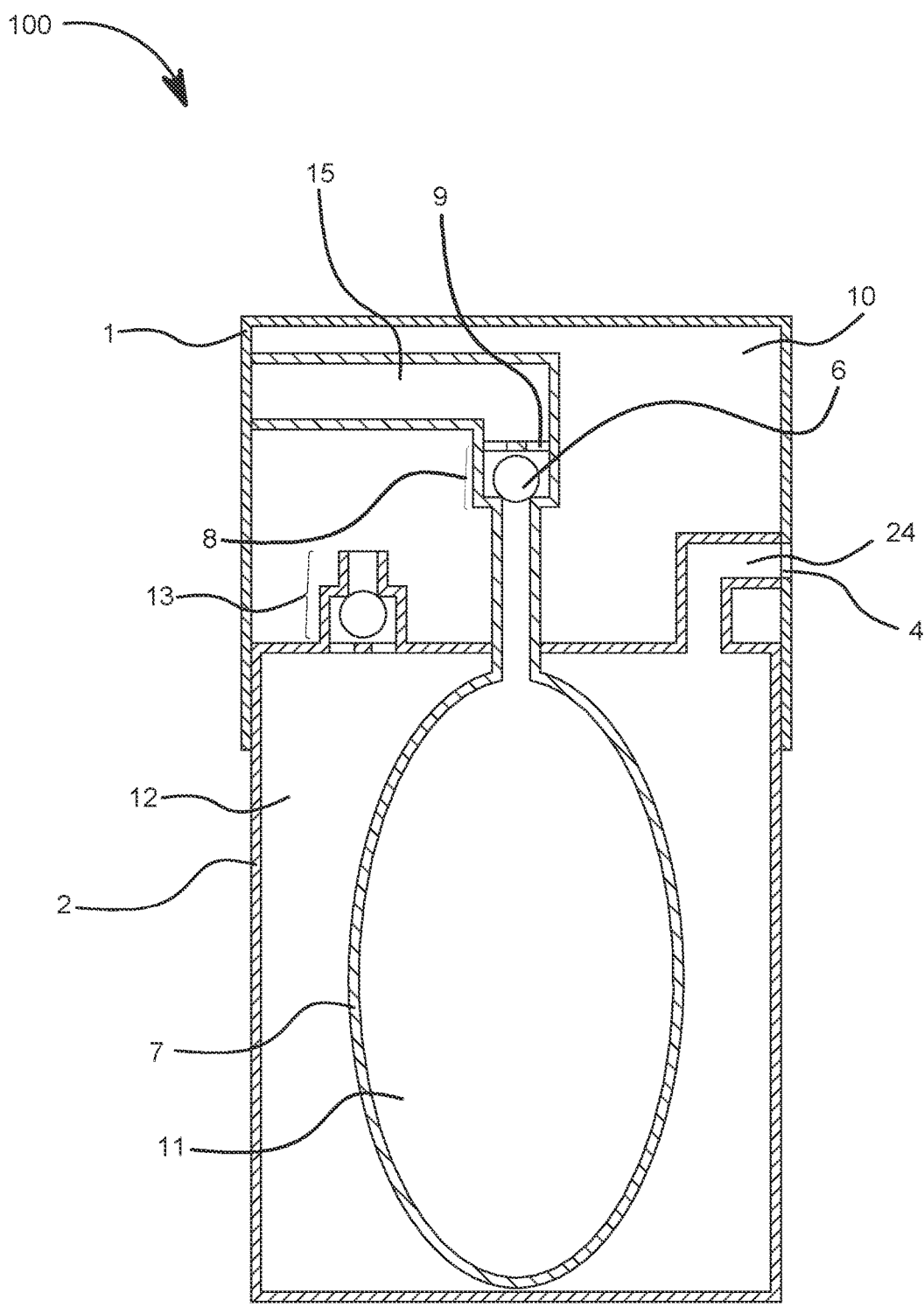
Figure 11:
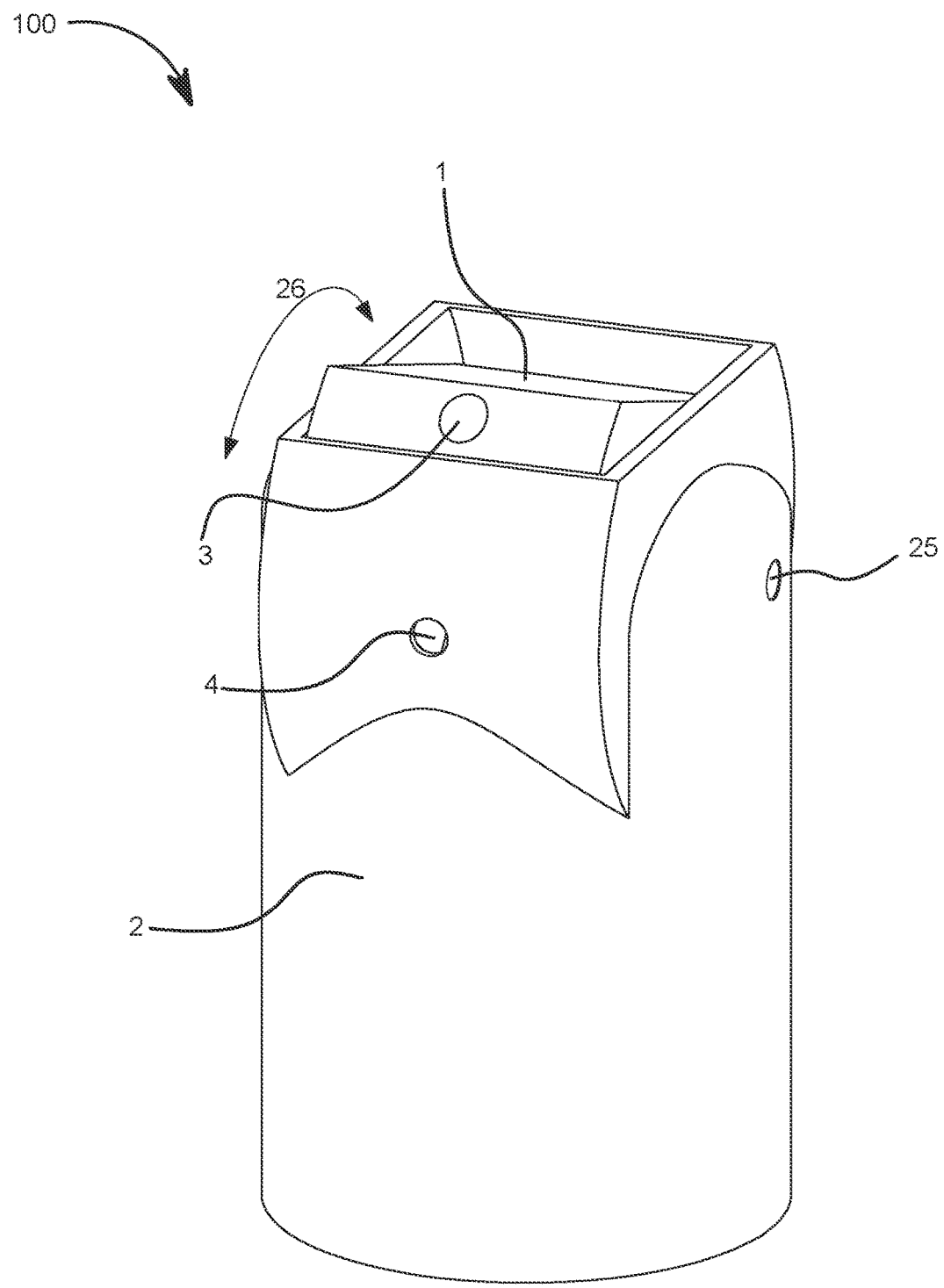
Figure 12:
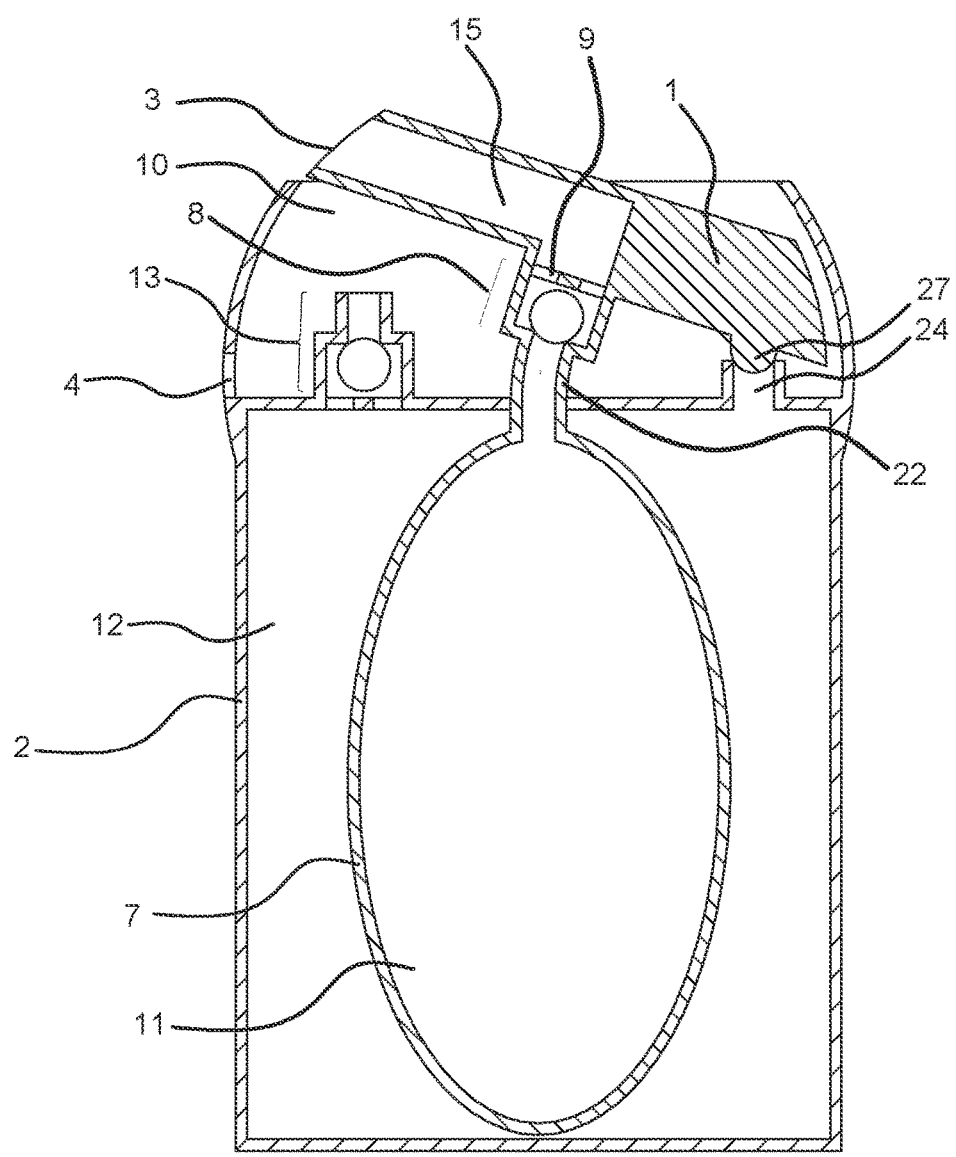
Figure 13:
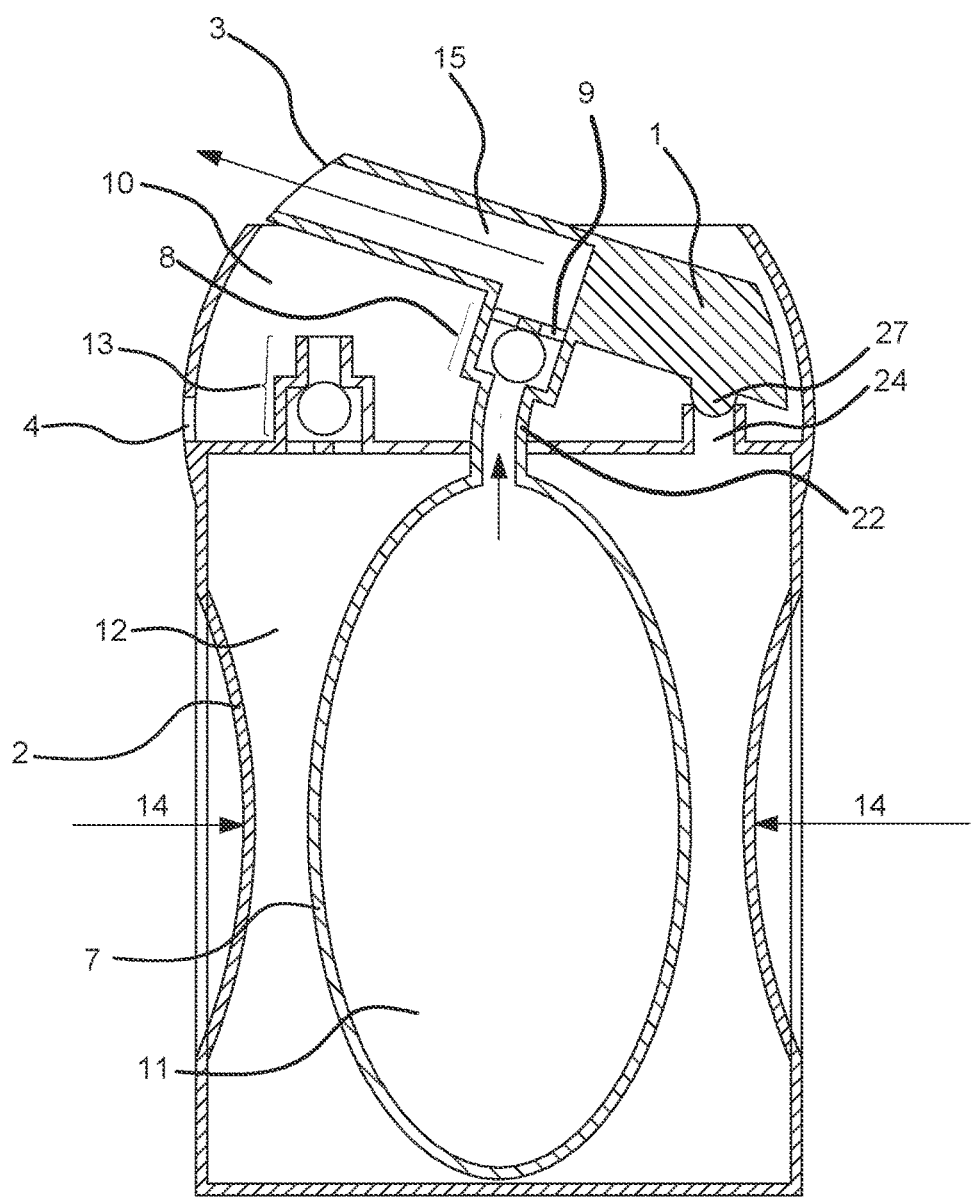
Figure 14:
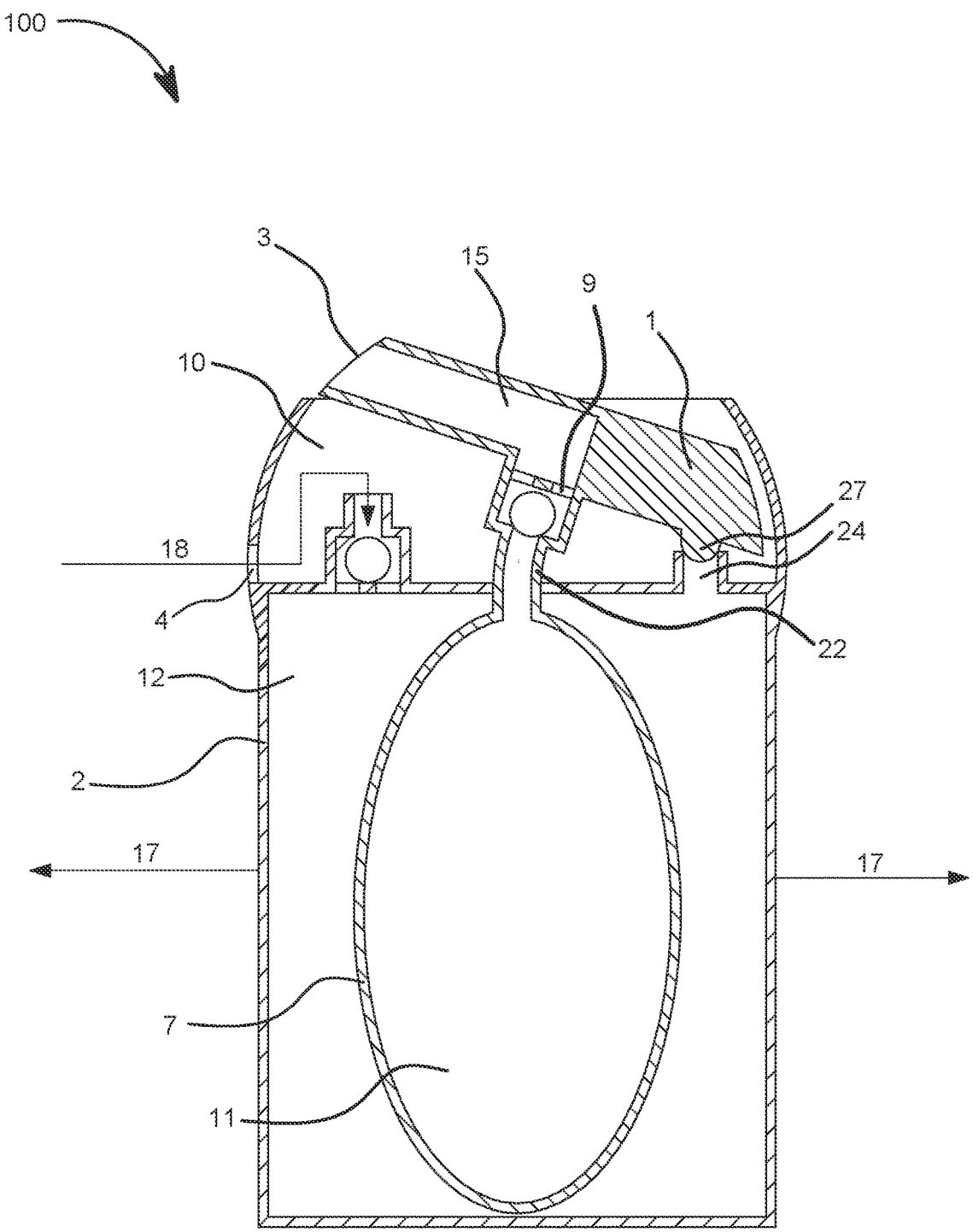
Figure 15:
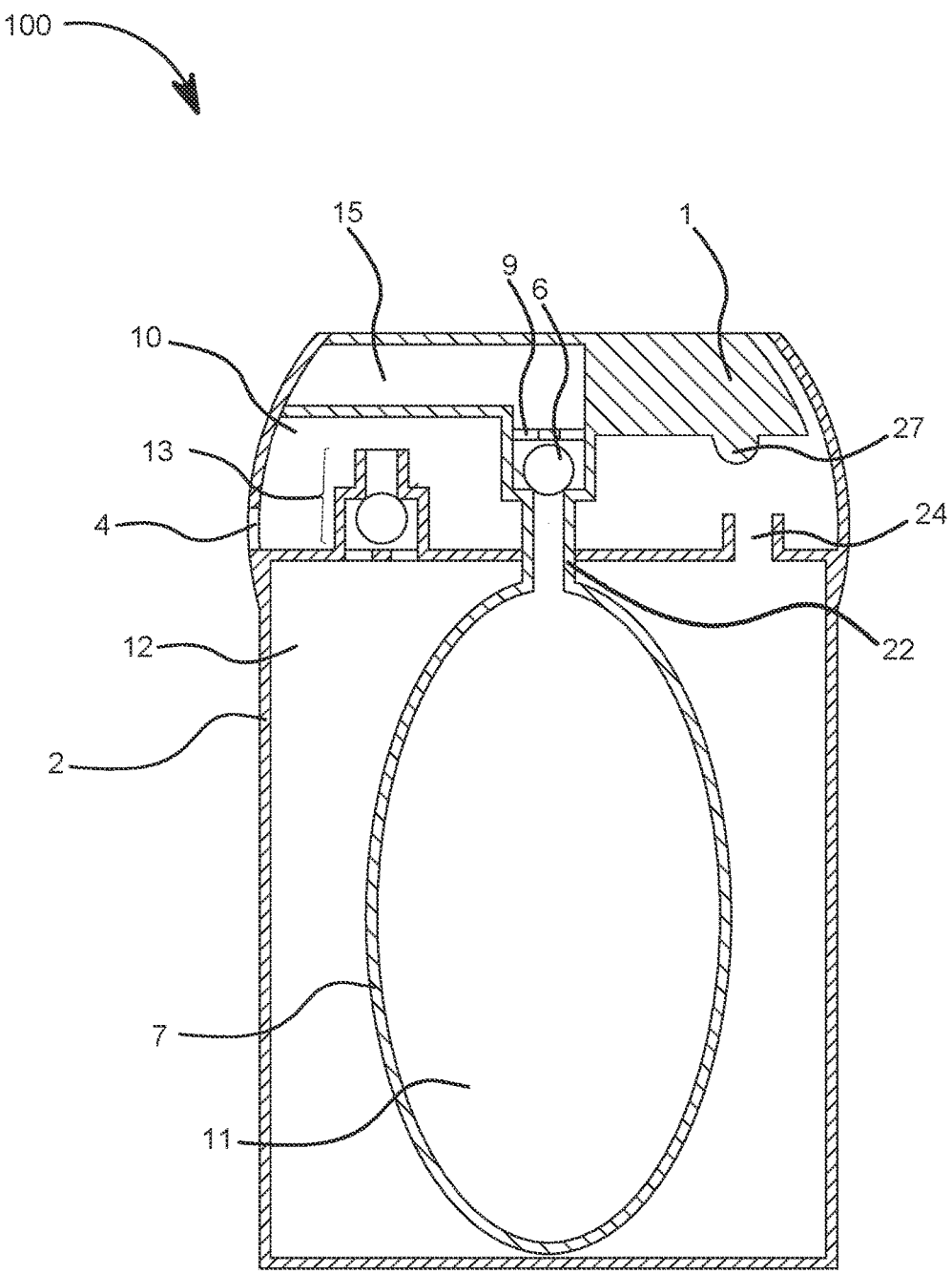
Figure 16:
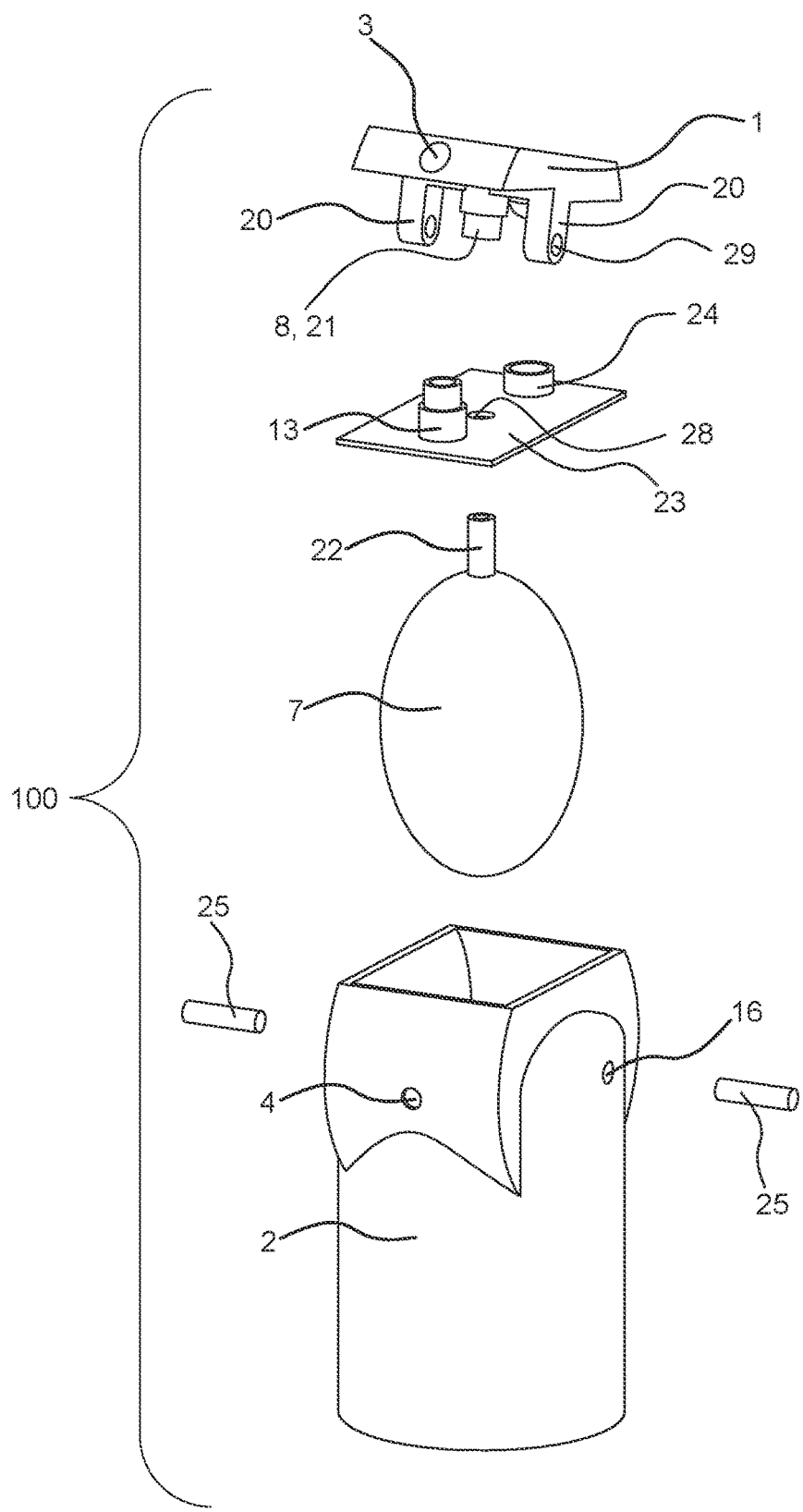
Figure 17:
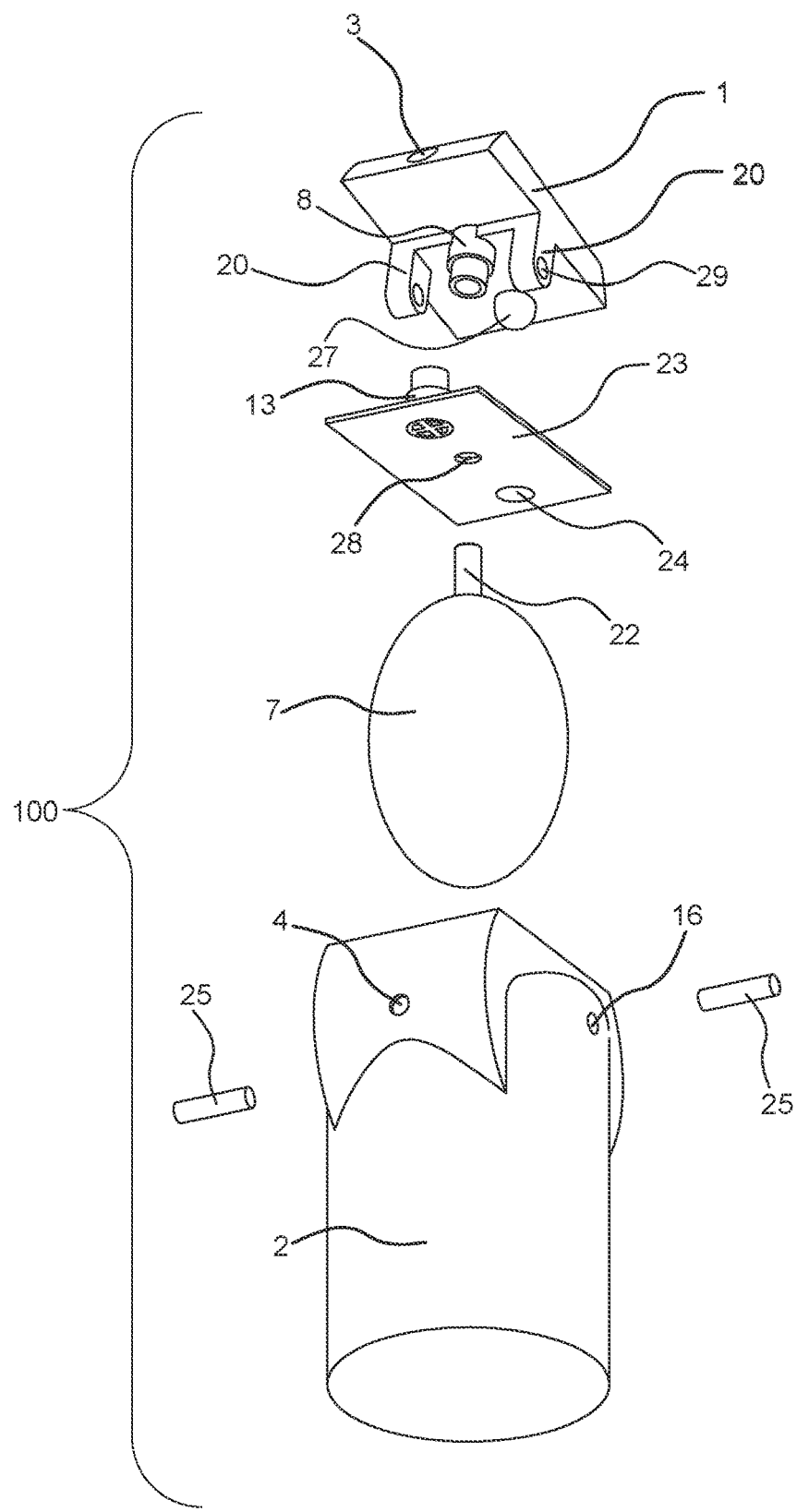

Having thus described the presently disclosed subject matter in general terms, reference will now be made to the accompanying Drawings, which are not necessarily drawn to scale, and wherein:

FIGS. 1A-B illustrates a perspective view of one example of the presently disclosed squeeze dispenser wherein cap is shifted from a closed position to an open position by pulling it away from the housing, and vice versa by pressing it towards the housing. FIG. 1A features the dispensing opening and FIG. 1b features the air opening;

FIG. 2 illustrates a sectional view of the example of a squeeze dispenser illustrated in FIGS. 1A-B, wherein the cap is in an open position;

FIG. 3 illustrates a sectional view of the example of a squeeze dispenser illustrated in FIGS. 1A-B, wherein the cap is in an open position and pressing force is applied to the sidewalls of the non-rigid housing;

FIG. 4 illustrates a sectional view of the example of a squeeze dispenser illustrated in FIGS. 1A-B, wherein the cap is in still in an open position, however the pressing force is no longer applied allowing the non-rigid housing to return to its original shape (illustrated in FIGS. 1-3);

FIG. 5 illustrates a sectional view of the example of a squeeze dispenser illustrated in FIGS. 1A-B, wherein the cap is in a closed position and atmospheric air is allowed to flow into, and out of, the housing internal space;

FIGS. 6A-B illustrates a perspective view of another example of the presently disclosed squeeze dispenser wherein the cap is shifted from a closed position to an open position by spin rotating it relative to the housing. FIG. 6A features the dispensing opening and FIG. 6B feature the air opening;

FIG. 7 illustrates a sectional view of the example of a squeeze dispenser illustrated in FIGS. 6A-B, wherein the cap is in an open position;

FIG. 8 illustrates a sectional view of the example of a squeeze dispenser illustrated in FIGS. 6A-B, wherein the cap is in an open position and pressing force is applied to the sidewalls of the non-rigid housing;

FIG. 9 illustrates a sectional view of the example of a squeeze dispenser illustrated in FIGS. 6A-B, wherein the cap is in still in an open position, however the pressing force is no longer applied allowing the non-rigid housing to return to its original shape (illustrated in FIGS. 6-8);

FIG. 10 illustrates a sectional view of the example of a squeeze dispenser illustrated in FIGS. 6A-B, wherein the cap is in a closed position and atmospheric air is allowed to flow into, and out of, the housing internal space;

FIG. 11 illustrates a perspective view of yet another example of the presently disclosed squeeze dispenser wherein the cap is shifted from a closed position to an open position by a seesaw rotation. FIG. 11 features the dispensing opening and the air opening;

FIG. 12 illustrates a sectional view of the example of a squeeze dispenser illustrated in FIG. 11, wherein the cap is in an open position;

FIG. 13 illustrates a sectional view of the example of a squeeze dispenser illustrated in FIG. 11, wherein the cap is in an open position and pressing force is applied to the sidewalls of the non-rigid housing;

FIG. 14 illustrates a sectional view of the example of a squeeze dispenser illustrated in FIG. 11, wherein the cap is in still in an open position, however the pressing force is no longer applied allowing the non-rigid housing to return to its original shape (illustrated in FIGS. 11-13);

FIG. 15 illustrates a sectional view of the example of a squeeze dispenser illustrated in FIG. 11, wherein the cap is in a closed position and atmospheric air is allowed to flow into, and out of, the housing internal space;

FIG. 16 illustrates an exploded view of the example of a squeeze dispenser illustrated in FIG. 11;

FIG. 17 illustrates another exploded view of the example of a squeeze dispenser illustrated in FIG. 11.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains, having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a squeeze dispenser and more particularly to a bag-in-bottle type of a dispenser, comprising a flexible bag for containing and dispensing of fluid and means to equilibrate atmospheric air pressure with air pressure inside the dispenser.

Presently disclosed is a bag-in-bottle type squeeze dispenser which includes a non-rigid dispenser housing (also referred to herein as "housing"), a flexible bag for containing and dispensing fluid, a cap, and means to equilibrate atmospheric air pressure with air pressure inside the housing. Disparities in air pressure between the atmospheric air and the air inside the dispenser (in-between the housing and the flexible bag) present a problem in the art. In many situations, such as during air transportation involving high altitudes, high atmospheric temperature, or simply when the user transports the squeeze dispenser during vacation, camping trip, etc., the air trapped inside the bag-in-bottle type dispenser expands, creating a pressing force on the flexible bag. Consequently, when a user opens the dispenser's cap to put it to use at such times, the contents of the bag squirt out resulting in waste and an upsetting mess.

The presently disclosed squeeze dispenser is a reusable, or a disposable, dispenser which comprises a flexible bag for containing and dispensing fluid. In a preferred embodiment, the contents in the flexible bag are not allowed to make contact with atmospheric air, thus prolonging the product (contents) shelf life and integrity and reducing waste. Preferably, all, or substantially most, of the flexible bag's contents are expelled, as desired, as the user dispenses the product.

To overcome pressure variances due to temperature and/or transportation from manufacturing facility to consumer, as described above, the cap includes a feature that allows air flow into, and out of, the squeeze dispenser when the cap is in a closed position. Thus, allowing for equalizing the air pressure inside the squeeze dispenser with the air pressure of the atmospheric air.

When the cap is moved to an open position, prior to use, the said feature no longer allows air flow into, and out of, the squeeze dispenser, thus locking the air inside the squeeze dispenser in place. Therefore, when pressing force is applied to the non-rigid housing, the contents of the flexible bag are expelled. In some embodiments, the fluid expelled from the flexible bag flows through a dispensing valve means. In some embodiments, the dispensing valve means is a one-way valve or a one-way check valve. In some embodiments, the one-way valve is located in the cap of the dispenser. Subsequently, fluid flowing through the one-way valve is dispensed through an opening in the cap and thus becomes available to the user. When the pressing force is released, a one-way air valve allows ingress of atmospheric air into the squeeze dispenser to compensate for the flexible bag reduced volume after contents are dispensed, thus allowing a user to apply pressing force again to dispense more product or move the cap to a closed position, as desired.

Referring now to FIGS. 1A-B and FIGS. 6A-B, two examples of the presently disclosed squeeze dispenser 100 are illustrated. Importantly, the description below of elements, parts and embodiments thereof may also apply to the same elements and parts of the embodiment illustrated in FIG. 11. The squeeze dispenser 100 comprises a housing 2 and a cap 1. In a preferred embodiment, the housing 2, or the sidewalls of the housing or portion/s thereof, is/are fashioned of a non-rigid material. In some other preferred embodiments, the housing, or the housing's sidewalls 2 or portion/s thereof, is/are adapted for manual compression. The housing 2 or portions thereof may be made of any suitable material or composite, and may be made of metal, glass, paper, plastics, ceramic, cardboard, rubber, polymer, or combinations thereof. The housing 2 may be made from one part or multiple parts, e.g., it may be divided and split in different locations to allows for multiple modalities for manufacturing of the housing 2 and/or different functionalities of different parts/portions of the housing 2. In a preferred embodiment, the housing 2, or the sidewalls of the housing or portion/s thereof, is/are elastic. Therefore, when manual compression, such as pressing force, is applied to the housing 2, or the sidewalls of the housing or portion/s thereof, the material/portion deformed come back to its original size or shape when the pressing force vanishes.

The cap 1 fits over the top part of the housing 2 and in some embodiments comprises at least one opening. In some embodiments, the openings are the dispensing opening 3 (depicted in FIGS. 1A and 6A) and the air opening 4 (depicted in FIGS. 1B and 6B). The dispensing opening 3 and air opening 4 are essentially holes positioned in a wall of the cap 1. However, in some other embodiments, the air opening 4 may be located in a wall of the housing 2. The cap 1 of the presently disclosed squeeze dispenser 100 may be in an open or in a closed position. According to the embodiment of FIGS. 1A-B, the cap 1 may be shifted from an open position to a closed position and vice versa by moving (movement depicted by arrowed line 5) the cap 1 towards, or away from, the housing 2. In the example further depicted in FIGS. 2-5, the cap 1 is moved to an open position by pulling it upwards, away from the housing 2, and to a closed position by pressing it downwards towards the housing 2. However, in some other embodiments, the cap 1 is moved to an open position by pressing it toward the housing 2 and to a closed position by pulling it away from the housing 2. According to the embodiment of FIGS. 6A-B, the cap 1 may be shifted from an open position to a closed position and vice versa by spinning it relative to the housing 2 (movement depicted by arrowed line 19). In some embodiments, the closed and open positions of the cap 1 are pre-determined positions on the circumference or length of the housing 2. In some embodiments, the cap 1 is releasably secured in a closed and/or open position. Means for releasably securing the cap 1 in an open or in a closed position include any suitable means known and traditionally used in the art including magnets, friction, grooves and notches, etc.

The presently disclosed squeeze dispenser 100 is essentially cylindrical, however any suitable shape for the squeeze dispenser 100 or elements thereof is within the scope of the present disclosure.

Moving now to FIGS. 2-5 and FIGS. 7-10, sectional views of the example illustrated in FIGS. 1A-B and the example illustrated in FIGS. 6A-B, respectively, are depicted. While FIGS. 2-5 and FIGS. 7-10 are specifically referred to, the description below of elements, parts and embodiments thereof may also apply to the same elements and parts in the embodiments illustrated in FIGS. 12-17. The squeeze dispenser 100 comprises a flexible bag 7, open on one end, for holding a fluid. The flexible bag 7 is substantially located within the housing 2 and comprises a neck portion 22 (pointed to in FIGS. 16 and 17) which extends downwards from the cap 1. The flexible bag 7 is designed for holding a fluid and is of sufficient wall strength to expand without rupture within the confines of the housing 2. In some embodiments, the flexible bag 7 may be made of metal (including foil), paper, plastics, cardboard, rubber, polymer, elastomeric material, or combinations thereof. Examples of a suitable elastomeric material, include but are not limited to, natural rubbers, styrene-butadiene block copolymers, polyisoprene, polybutadiene, ethylene propylene rubber, ethylene propylene diene rubber, silicone elastomers, fluoroelastomers, polyurethane elastomers, nitrile rubbers, and combinations thereof. In some embodiments, the flexible bag 7 is made of an elastomeric material which is of food grade and suitable for use with, for example beverages or condiments. For example, depending on the contents of the flexible bag 7, the flexible bag 7 is fashioned of an elastomer which has a high gaseous carbon dioxide retention property and/or low permeability to gaseous oxygen.

In some embodiments, the open end of the flexible bag 7 is attached to, and is in a fluid communication with, a one-way valve 8 (also referred to herein as "dispensing valve"). In some embodiments, the attachment of the open end of the flexible bag 7 to the one-way valve 8 is releasable. In the embodiment shown, the one-way valve 8 is located in the cap internal space 10 which is defined in-between the interior side of the cap 1 and exterior side of the non-rigid housing 2 proximal to the cap 1. However, in some other embodiments, the one-way valve 8 may be located in the housing internal space 12 which is defined in-between the interior side of the housing 2 and the exterior side of the flexible bag 7.

The one-way valve 8 is in fluid communication with the flexible bag 7 and a dispensing pathway 15 wherein the fluid admitting end of the one-way valve 8 faces the flexible bag 7 and the dispensing end of the one-way valve 8 faces the dispensing pathway 15. The dispensing pathway 15 is essentially a tunnel-like structure of any suitable length, shape, and width. When the cap 1 is in an open position, the dispensing pathway 15 is in fluid communication with the dispensing opening 3, through which the contents of the flexible bag 7 may be dispensed out of the squeeze dispenser 100. The dispensing opening 3 may be of any suitable dimensions or shape. One skilled in the art will appreciate that the outer side of the cap 1 may also comprise a structure around the dispensing opening 3 and in a fluid communication with it (not shown). For example, such structure may be an O-ring around the opening, a funnel like structure, a funnel-like structure tapering off at an open end distal to the cap 1, or any such suitable structure suitable for dispensing the contents the bag 7 at some distance from the cap 1 main circumference.

The squeeze dispenser 100 further comprises a one-way air valve 13 located on the housing 2 in such manner as to allow air flow into the housing internal space 12 to compensate for a decrease in the flexible bag's volume 11 after fluid is dispensed. The one-way air valve 13 may be located anywhere on the housing as long as the one-way valve 13 has access to air to enable admitting air into the housing internal space 12 as described above. In the example depicted, the air admitting end of the one-way air valve 13 opens into the cap internal space 10.

The dispensing valve means (one-way valve 8) and the one-way air valve 13 of the present disclosure may be any types of valves known in the art and designed for passage of fluid or air, respectively. For example, the valves 8 (dispensing valve means) and 13 of the present disclosure may be, without limitation, an umbrella valve, a poppet valve, a check valve, a ball valve (depicted in the examples of FIGS. 1-16), a butterfly valve, a gate valve, a choke valve, a diaphragm valve, a pinch valve, and so forth. In a preferred embodiment, the one-way valve 8 is not only substantially fluid-tight (allowing fluid to flow only from the flexible bag 7 and not back into it) but also airtight. Thus, preventing air from entering into the bag when pressing force on the outside of the squeeze bottle is released. In some embodiments, the one-way valve 8 is a high flow rate valve.

The presently disclosed squeeze dispenser 100 further comprises a closable air channel 24. In some embodiments, the closable air channel 24 is substantially a tunnel-like structure comprising two ends, the first end opens into the housing internal space 12 and the second end is closable. The closable air channel 24 may be in an open or in a closed position. When the closable air channel 24 is in an open position it allows for atmospheric air flow into, or out of, the housing internal space 12. Generally, when the cap 1 is in an open position the closable air channel 24 is in a closed position, and vice versa. In a preferred embodiment, with the exception of air flow through the closable air channel 24 (when said channel 24 is in an open position) or air admitted via the one-way air valve in certain situations, as will be further discussed below, the internal housing space 12 is airtight, or substantially airtight.

FIG. 2 illustrates the squeeze dispenser 100 wherein the cap 1 has been pulled upwards, away from the housing 2, and is in an open position. FIG. 7 illustrates the squeeze dispenser 100 wherein the cap 1 has been spin rotated to an open position. The open end of the dispensing pathway 15, distal to the one-way valve 8, aligns with the dispensing opening 3 and is in fluid communication with it. The air opening 4, however, does not align with the second end of the closable air channel 24. Instead, the second end of the closable air channel 24 opens into a sidewall of the cap 1. In a preferred embodiment, the junction of the second end of the closable air channel 24 and the sidewall of the cap 1 is airtight or substantially airtight. In some embodiments, such airtight, or substantially airtight junction, may be enabled by sealing materials which may be, without limitation, rubber or silicone; the materials being included in the second end of the closable air channel 24, and/or the interior side of the cap 1. For example, the second end of the closable air channel 24, and/or the interior side of the cap 1 may be coated, or partially coated, with said sealing materials. Thus, the air present in the interior housing space 12 is substantially, or completely, locked in place. The one-way valve 8, however, is still in a closed position, as exemplified by the valve's ball blocking the passage of the flexible bag 7 contents.

Therefore, when pressing force (represented in FIG. 3 and in FIG. 8 by arrowed lines 14) is applied to the sidewalls of the housing 2, deforming the pressed-on sidewalls toward the flexible bag 7, the air locked in the housing internal space 12 presses on the flexible bag 7 and causes the flexible bag 7 to lose volume 11 as its contents push through a neck portion 22 of the flexible bag 7 and in turn apply pressure on the one-way valve 8. Opening of the one-way valve 8 is depicted by the valve's ball 6 moving to allow the passage of the flexible bag 7 contents through the valve's opening 9. Next, the contents flow through the dispensing pathway 15 and to the outside of the squeeze dispenser 100 via the dispensing opening 3.

Upon cessation of the pressing force 14, the sidewalls of the housing 2 are allowed to regain their original shape (the return to shape is represented by arrowed lines 17 in FIG. 4 and FIG. 9). The air in the interior housing space 12 no longer applies pressure on the flexible bag 7 and the one-way valve 8 returns to a closed position, as depicted by the valve's ball 6 blocking the flexible bag's neck portion 22 opening. As the sidewalls of the housing 2 return to their original shape the one-way air valve 13 allows ingress of atmospheric air into the housing internal space 12 to compensate for the flexible bag 7 reduced volume 11 after fluid was dispensed. Atmospheric air flowing into the housing internal space 12 enters the cap internal space 10 through the air opening 4 (the flow of air through the air opening 4 and into the one-way air valve 13 is symbolically illustrated in FIG. 4 and FIG. 9 by an arrowed line).

As the air pressure in the interior housing space 12 and the shape of the housing 2 sidewalls are restored, a user may now decide to dispense more liquid by applying pressing force 14 to the sidewalls (as illustrated in FIG. 3 and FIG. 8) again. Alternatively, a user may decide to not dispense any more fluid and instead close the cap 1. In the embodiment of FIGS. 1-5, closing the cap 1 is done by pressing it towards the housing 2. In the embodiment of FIGS. 6-10, closing the cap 1 is done by spinning relative to the housing 2. As illustrated in FIGS. 5 and 10, when the cap 1 is in a closed position the opening of the dispensing pathway 15 is no longer aligned with the dispensing opening 3. However, closing the cap 1 causes the alignment of the second end of the closable air channel 24 with the air opening 4 thus switching the closable air channel 24 to an open position, and allowing for atmospheric air flow into, and out of, the internal housing space 12.

FIG. 11 illustrates yet another example of the presently disclosed squeeze dispenser 100. The squeeze dispenser 100 of FIG. 11 comprises a housing 2 and a cap 1. The housing 2 comprises an air opening 4 and the cap 1, depicted in an open position, comprises a dispensing opening 3. The housing 2 further comprises at least one dowel pin hole 16. In a preferred embodiment, the housing 2 comprises two dowel pin holes 16, horizontally and vertically aligned, and positioned on two opposite sides of the housing 2. The cap 1 of the embodiment of FIG. 11 may be in an open or closed position. Shifting the cap 1 from an open position to a closed position, and vice versa, is done by a seesaw rotation 26 (or a modified seesaw motion). Pressing down on the side of the cap 1 distal from the dispensing opening 3 places the cap 1 in an open position, exposing the dispensing opening 3 to the outside of the squeeze dispenser 100. Subsequently, pressing down on the side of the cap 1 proximal to the dispensing opening 3 places the cap 1 in a closed position, and the dispensing opening 3 is no longer exposed to the outside of the squeeze dispenser 100.

Referring now to FIG. 12, the squeeze dispenser 100 comprises a flexible bag 7, open on one end, for holding a fluid. The flexible bag 7 is substantially located within the housing 2 comprises a neck portion 22 which extends downwards from the cap 1.

In some embodiments, the open end of the flexible bag 7 is attached to, and is in a fluid communication with, a one-way valve 8. In some embodiments, the attachment of the open end of the flexible 7 to the one-way valve 8 is releasable. In the embodiment shown, the one-way valve 8 is located in the cap internal space 10 which is defined in-between the interior side of the cap 1 and sides of the non-rigid housing 2 which are proximal to the cap 1. However, as described above, in some other embodiments, the one-way valve 8 may be located in the housing internal space 12 which is defined in-between the interior side of the housing 2 and the exterior side of the flexible bag 7.

The one-way valve 8 is in fluid communication with the flexible bag 7 and a dispensing pathway 15 wherein the fluid admitting end of the one-way valve 8 faces the flexible bag 7 and the fluid dispensing end of the one-way valve 8 faces the dispensing pathway 15. The dispensing pathway 15 is positioned within the cap 1 and comprises on its end distal from the one-way valve 8 the dispensing opening 3. The dispensing pathway 15 is essentially a tunnel-like structure of any suitable length, shape, and width. When the cap 1 is in an open position, the dispensing opening 3 is exposed to the outside of the squeeze dispenser 100. The dispensing opening 3 may be of any suitable dimensions or shape.

The squeeze dispenser 100 further comprises a one-way air valve 13 located on the housing 2 in such manner as to allow air flow into the housing internal space 12 to compensate for decreases in the flexible bag's volume 11 after fluid is dispensed. The one-way air valve 13 may be located anywhere on the housing as long as the one-way valve 13 has access to air to enable admitting air into the housing internal space 12 as described above. In the example depicted, the air admitting end of the one-way air valve 13 opens into the cap internal space 10.

The presently disclosed squeeze dispenser 100 further comprises a closable air channel 24. In some embodiments, the closable air channel 24 is substantially a tunnel-like structure comprising two ends, the first end opens into the housing internal space 12 and the second end opens into the cap internal space 10 and is closable. The closable air channel 24 may be in an open or in a closed position. When the closable air channel 24 is in an open position it allows for atmospheric air flow into, or out of, the housing internal space 12. According to the present embodiment, the cap 1 further comprises on its interior side distal from the dispensing opening 3 a closing means 27 for closing the second end of the closable air channel 24. In some embodiments, the closing means 27 is a protrusion designed to fit into, or around, the second end of the closable air channel 24. In a preferred embodiment, when the closing means 27 is fitted into, or around, the second end of the closable air channel 24, the closure is airtight. In some embodiments, such airtight, or substantially airtight closure, may be enabled by sealing materials which may be, without limitation, rubber or silicone; the materials being included in the second end of the closable air channel 24, and/or the closing means 27. For example, the second end of the closable air channel 24, and/or the closing means 27 may be coated, or partially coated, with said sealing materials. Pressing down on the side of the cap 1 distal from the dispensing opening 3 places the cap 1 in an open position wherein the dispensing opening 3 faces the outside of the squeeze dispenser, it also places the closing means 27 in position to close the closable air channel 24. Subsequently, pressing down on the side of the cap 1 proximal to the dispensing opening 3 places the cap 1 in a closed position wherein the dispensing opening 3 faces the inside of the squeeze dispenser 100 and the closing means 27 no longer closes the closable air channel 24, thus allowing atmospheric air to flow into, and out of, the interior housing space 12. In some embodiments when the cap 1 is in a closed position the junction of the dispensing opening 3 and the interior of the housing is fluid-tight or substantially fluid-tight. Such fluid-tight junction may be may be enabled by sealing materials which may be, without limitation, rubber or silicone; the materials being included in the dispensing opening 3, and/or the interior side of the housing 2 or portions thereof. For example, the dispensing opening 3, and/or the interior side of the housing 2 or portions thereof may be coated, or partially coated, with said sealing materials.

Essentially, when the cap 1 is in an open position the closable air channel 24 is in a closed position, and vice-versa. In a preferred embodiment, with the exception of air flow through the closable air channel 24 (when said channel 24 is in an open position) or air admitted via the one-way air valve in certain situations, as discussed herein, the internal housing space 12 is airtight, or substantially airtight.

FIG. 12 illustrates the squeeze dispenser 100 wherein the side of the cap 1 distal from the dispensing opening 3 was pressed down and the cap 1 in an open position wherein the dispensing opening 3 faces the outside of the squeeze dispenser 100. Consequently, the closable air channel 24 is closed by the cap's 1 closing means 27. Thus, the air present in the interior housing space 12 is substantially, or completely, locked in place. The one-way valve 8, however, is still in a closed position, as exemplified by the valve's ball blocking the passage of the flexible bag 7 contents.

Therefore, when pressing force (represented in FIG. 13 by arrowed lines 14) is applied to the sidewalls of the housing 2, deforming the pressed-on sidewalls toward the flexible bag 7, the air locked in the housing internal space 12 presses on the flexible bag 7 and causes the flexible bag 7 to lose volume 11 as its contents push through the neck portion 22 and in turn applies pressure on the one-way valve 8. Opening of the one-way valve 8 is depicted by the valve's ball 6 (pointed to in at least FIG. 15) moving to allow the passage of the flexible bag's 7 contents through the valve's opening 9. Next, the contents flow through the dispensing pathway 15 and to the outside of the squeeze dispenser 100 via the dispensing opening 3.

Upon cessation of the pressing force 14, the sidewalls of the housing 2 are allowed to regain their original shape (the return to shape is represented by arrowed lines 17 in FIG. 14). The air in the interior housing space 12 no longer applies pressure on the flexible bag 7 and the one-way valve 8 returns to a closed position, as depicted by the valve's ball 6 blocking the flexible bag's neck portion 22 opening. As the sidewalls of the housing 2 return to their original shape the one-way air valve 13 allows ingress of atmospheric air into the housing internal space 12 to compensate for the flexible bag 7 reduced volume 11 after fluid was dispensed. Atmospheric air, flowing into the housing internal space 12 via the one-way air valve 13, is allowed to enter the cap internal space 10 through the air opening 4 (the flow of air through the air opening 4 and into the air admitting end of the one-way air valve 13 is symbolically illustrated in FIG. 14 by arrowed line 18).

As the air pressure in the interior housing space 12 and the shape of the housing 2 sidewalls are restored, a user may now decide to dispense more liquid by applying pressing force 14 to the sidewalls (as illustrated in FIG. 13) again. Alternatively, a user may decide to not dispense any more fluid and instead to close the cap 1. In the embodiment of FIGS. 11-17, closing the cap 1 is done by pressing down on its side proximal to the dispensing opening 3. When the cap 1 is in a closed position, as illustrated in FIG. 15, the dispensing opening 3 is no longer exposed to the outside of the squeeze dispenser 100 and the second end of the closable air channel 24 is open, allowing for atmospheric air, admitted into the cap internal space via air opening 4, to flow into, and out of, the internal housing space 12. Thereby, overcoming air pressure variances between the atmospheric air and the internal housing space 12.

FIGS. 16 and 17 depict an exploded view of the squeeze dispenser 100 illustrated in FIGS. 11-15. The housing 2 is illustrated comprising an air opening 4 and dowel pins holes 16. In some embodiments, a plate 23 is an integral part of the housing 2. In some other embodiments, plate 23 is a releasable part of the housing. For example, the plate 23 may be released from the housing 2 for the purpose of cleaning, replacing, and/or refilling the flexible bag 7. The plate 23 comprises a one-way air valve 13, the closable air channel structure 24, and an opening 28 through which the neck portion 22 of the flexible bag 7 passes. The neck portion 22 may then be releasably, or permanently, attached to the one-way valve 8, 21 positioned on the bottom side of the cap 1. In some embodiments, this attachment may be achieved by inserting the open end of the neck portion 22 into the one-way valve's sleeve part 21. In some embodiments, the neck portion 22 may be fashioned of a material more rigid than the material of the fluid holding portion of the flexible bag 7. The cap 1 further comprises the dispensing opening 3 and closing means 27. The cap 1 further comprises dowel attachment structures 20 comprising opening 29 for fitting in dowel pins 25. Therefore, dowel pins 25 may be inserted through the dowel pins holes 16 and be securely fitted in the dowel attachment structures 20 openings 29. Thus, upon assembly of the squeeze dispenser 100, the cap is secured to the housing while the seesaw rotation required for its opening and closing is enabled. A person skilled in the art will appreciate that any sort of attachment means that allows the above-mentioned seesaw rotation is within the scope of the present disclosure. In any of the embodiments disclosed herein, the squeeze dispenser 100 may be reusable or disposable. In some embodiment wherein the squeeze dispenser 100 is reusable, the flexible bag 7 is releasable from the one-way valve 8 and refillable or replaceable.

Operating the presently disclosed squeeze dispenser 100 includes the steps of:
 (a) Moving the cap 1 to an open position and thereby closing the closable air channel 24.
 (b) Applying a pressing force 14 on the sides of the housing 2 and collecting the fluid dispensed out of the dispensing opening 3.
 (c) Ceasing the pressing force and allowing the housing 2 sidewalls to return to their original shape 17.
 (d) Repeating step (b) and (c) as desired to dispense more fluid or otherwise moving the cap 1 to a closed position and thereby opening the closable air channel 24.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed is:

1. A squeeze dispenser, comprising:
    a non-rigid housing;
    a cap comprising a dispensing valve means, a dispensing pathway, and a dispensing opening, wherein said dispensing valve means and dispensing pathway are in a fluid communication;
    a flexible bag for holding a fluid, said flexible bag substantially located within said non-rigid housing and extending downwards from said cap; the bag being in fluid communication with said dispensing valve means; wherein an interior side of the non-rigid housing and an exterior side of the flexible bag define therebetween a housing internal space;
    a one-way air valve located on the housing;
    a closable air channel; wherein the closable air channel may be in an open or in a closed position; and wherein the closable air channel, when in an open position, allows for atmospheric air flow into, or out of, the housing internal space;
    wherein the one-way air valve allows ingress of atmospheric air into the housing internal space to compensate for the flexible bag reduced volume after fluid is dispensed; and,
    wherein an interior side of the cap and sides of the non-rigid housing proximal to said cap define therebetween a cap internal space.

2. The squeeze dispenser of claim 1, wherein the cap may be in an open or a closed position; and wherein when the cap is in the open position the dispensing pathway and dispensing opening align and when the cap is in the closed position the dispensing pathway and dispensing opening do not align.

3. The squeeze dispenser of claim 2, wherein the cap is moved from a closed position to an open position, and vice versa, by a manual movement selected from a group comprising press or pull, seesaw rotation, and spin rotation.

4. The squeeze dispenser of claim 3, wherein the squeeze dispenser further comprises an air opening; wherein the air opening is an opening in a wall of the cap or in a wall of the housing.

5. The squeeze dispenser of claim 4, wherein the closable air channel is substantially a tunnel-like structure comprising two ends, wherein a first end opens into the housing internal space; and wherein a second end is closable and opens either into the cap internal space, an interior sidewall of the cap or into the air opening.

6. The squeeze dispenser of claim 5, wherein the closable air channel is in an open position when the air opening is aligned with the second end of the closable air channel, allowing atmospheric air to flow into, or out of, the housing internal space.

7. The squeeze dispenser of claim 6, wherein when the cap is moved to a closed position, or is in a closed position, the air opening aligns with the second end of the closable air channel allowing atmospheric air flow into, or out of, the housing internal space via the closable air channel; and, wherein when the cap is moved to an open position, or is in an open position, the closable air opening does not align with the second end of the closable air channel, thus preventing atmospheric air flow into, or out of, the housing internal space via the air channel.

8. A method of using the squeeze dispenser of claim 7, the method comprises the steps of:
    (a) moving the cap to an open position by pulling it away from the non-rigid housing, thereby closing the closable air channel;
    (b) applying a pressing force on sidewalls of the non-rigid housing, thereby deforming the non-rigid housing sidewalls inward toward the flexible bag;
    (c) collecting the fluid dispensed out of the dispensing opening;
    (d) ceasing the pressing force and allowing the non-rigid housing sidewalls to return to their original shape;
    (e) repeating steps (b), (c) and (d) as desired to dispense more fluid or otherwise moving the cap to a closed position by pressing it towards the non-rigid housing, thereby opening the closable air channel.

9. A method of using the squeeze dispenser of claim 7, the method comprises the steps of:
    (a) moving the cap to an open position by spin rotating it relative to the non-rigid housing, thereby closing the closable air channel;
    (b) applying a pressing force on sidewalls of the non-rigid housing, thereby deforming the non-rigid housing sidewalls inward toward the flexible bag;
    (c) collecting the fluid dispensed out of the dispensing opening;
    (d) ceasing the pressing force and allowing the non-rigid housing sidewalls to return to their original shape;
    (e) repeating steps (b), (c) and (d) as desired to dispense more fluid or otherwise moving the cap to a closed position by spinning it in the opposite direction of the rotation of step (a), thereby opening the closable air channel.

10. The squeeze dispenser of claim 5, wherein the air opening allows for atmospheric air flow into, or out of, the cap internal space.

11. The squeeze dispenser of claim 10, wherein the second end of the closable air channel opens into the cap internal space; and wherein the cap comprises a closing mean for closing the second end of the closable air channel.

12. The squeeze dispenser of claim 11, wherein the closing mean is a protrusion designed to fit into, or around, the second end of the closable air channel.

13. The squeeze dispenser of claim 12, wherein when the closing mean is fitted into, or around, the second end of the closable air channel, the closure is air-tight.

14. The squeeze dispenser of claim 13, wherein when the cap is moved to a closed position, or is in a closed position, the second end of the closable air channel is open allowing atmospheric air flow into, or out of, the housing internal space via the closable air channel; and wherein when the cap is moved to an open position, or is in an open position, the closing means closes the second end of the closable air channel, thus preventing atmospheric air flow into, or out of, the housing internal space via the closable air channel.

15. A method of using the squeeze dispenser of claim 14, the method comprises the steps of:
   (a) moving the cap to an open position using a seesaw rotation, thereby closing the closable air channel;
   (b) applying a pressing force on sidewalls of the non-rigid housing, thereby deforming the non-rigid housing sidewalls inward toward the flexible bag;
   (c) collecting the fluid dispensed out of the dispensing opening;
   (d) ceasing the pressing force and allowing the non-rigid housing sidewalls to return to their original shape;
   (e) repeating steps (b), (c), and (d) as desired to dispense more fluid or otherwise moving the cap to a closed position by s seesaw rotation in the opposite direction of the rotation of step (a), thereby opening the closable air channel.

* * * * *